No. 757,641. PATENTED APR. 19, 1904.
L. E. SAUNDERS.
SELF GRIP AND DRAW-OFF ATTACHMENT FOR VESSELS.
APPLICATION FILED JULY 17, 1903.
NO MODEL.
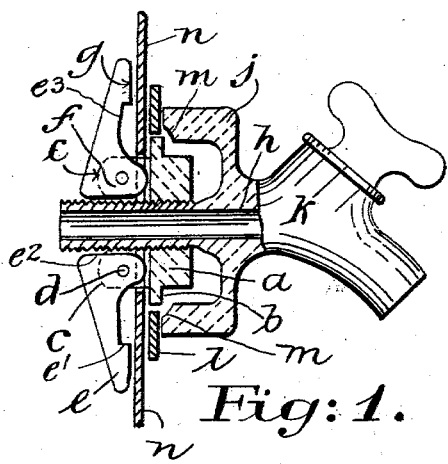
Fig: 1.
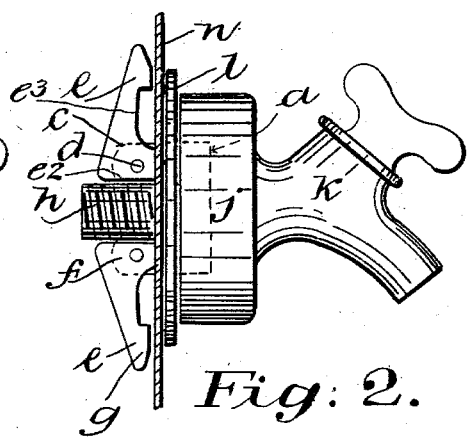
Fig: 2.
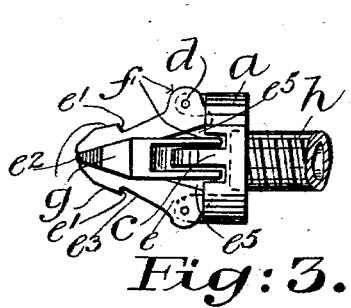
Fig: 3.
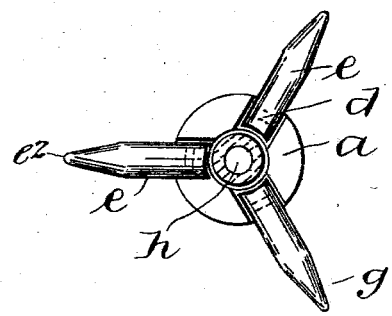
Fig: 4.
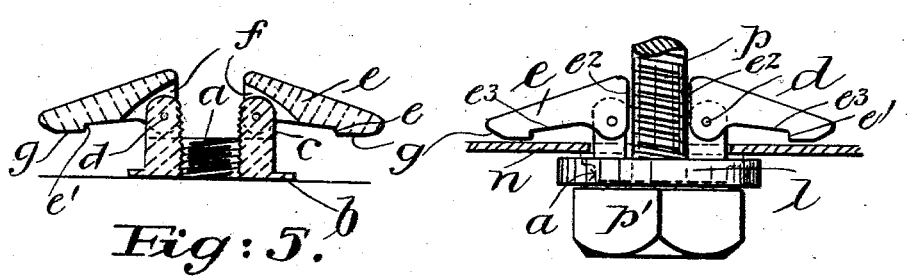
Fig: 5. Fig: 6.
Inventor,
Lewis Ernest Saunders.

No. 757,641.

Patented April 19, 1904.

UNITED STATES PATENT OFFICE.

LEWIS ERNEST SAUNDERS, OF PERTH, WESTERN AUSTRALIA, AUSTRALIA, ASSIGNOR OF ONE-THIRD TO HENRY JOHN SAUNDERS, OF PERTH, WESTERN AUSTRALIA, AUSTRALIA.

SELF-GRIP AND DRAW-OFF ATTACHMENT FOR VESSELS.

SPECIFICATION forming part of Letters Patent No. 757,641, dated April 19, 1904.

Application filed July 17, 1903. Serial No. 166,010. (No model.)

*To all whom it may concern:*

Be it known that I, LEWIS ERNEST SAUNDERS, engineer, a subject of His Majesty King Edward VII of Great Britain, and a resident of William street, Perth, Western Australia, Australia, have invented certain new and useful Improvements in Self-Grip and Draw-Off Attachments for Vessels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention has relation to appliances for connecting a draw-off or discharge tube or pipe fluid-tight to a vessel or conduit for fluids, which appliances may also be used for closing holes fluid-tight.

Broadly speaking, my invention comprises gripping elements and a hub to which said elements are pivotally connected, so as to fold together for the purpose of passing them through a hole in the wall to which the device is to be applied and to be spread out against such wall, in combination with a spreading member adapted to move through the hub to spread the gripping members and a clamping member fitting over said hub and carried by the spreading member and operating in conjunction and reciprocally with the gripping members as said spreading member moves through the hub to clamp the device to said wall, a suitable washer being interposed between said clamping member and said wall where a fluid-tight joint is desirable; but that my invention may be fully understood I will describe the same in detail, reference being had to the accompanying drawings, in which—

Figure 1 is a sectional side elevation, and Fig. 2 a side elevation, illustrating my invention in its use in connection with a tap applied to the wall of a vessel or conduit for fluids. Fig. 3 is a side elevation, and Fig. 4 a sectional end view, of the hub, showing the gripping members folded and spread, respectively. Fig. 5 is a cross-section of the hub with the gripping members spread, and Fig. 6 shows the device when used for closing a hole.

Referring to Figs. 1 and 2, $n$ indicates the wall of a vessel, for instance, to which a tap is to be connected fluid-tight. $e$ indicates gripping members, hereinafter referred to as the "grippers," having flat inner end faces $e^2$ at right angles or substantially at right angles to their longitudinal axes. The inner end or heel of the grippers is slotted and perforated for the reception, respectively, of lugs $c$ on a hub $a$ and pivot-pins $d$, by means of which the grippers are pivoted to said lugs. The front or gripping edge of the grippers is recessed, as shown at $e^3$, from near the heel end toward the free end, forming an abrupt or rather sharp-edged shoulder $e'$, from which shoulder toward the free end is formed a substantially flat gripping-face $g$, beyond which the gripper is beveled to its free end. The back or rear edge of the grippers is rounded or convex, as shown in Fig. 4, and the forward end made tapering to form with the taper on the front edge a more or less sharp point $e^2$.

The heel of the grippers is so shaped that when folded the outer edge, which is rounded, will not project or will project but slightly beyond the periphery of the hub $a$, while the inner edge will project over the bore of the hub to or approximately to the center of said bore, so that when folded the grippers will lie back to back, with their pointed ends $e^2$ in line with the longitudinal axis of the bore of the hub $a$, or substantially so, said grippers being individually and collectively adapted to perform the function of punches or a punch, respectively, for punching a hole into a sheet-metal vessel.

From the drawings it will be seen that the grippers $e$ are of considerable cross-sectional area, so that quite broad gripping-surfaces are obtained.

The spreading member, hereinafter referred to as the "spreader," as shown in Figs. 1 and 2, is the externally-threaded tubular stem $h$ of a tap $k$, adapted to be screwed through the hub $a$, the bore of which is correspondingly threaded, and said spreader carries the clamping member in the form of a chambered collar $j$, of greater internal diameter than the external diameter of the hub $a$, so as to fit over said hub and engage the wall $n$.

The form of the hub $a$ and clamping member $j$ and the number of grippers $e$ will depend upon the surfaces to which the device is to be applied. If the surfaces are flat, I prefer to provide three grippers, so as to prevent displacement of the tap on lines at right angles to the vertical or horizontal line in which two grippers would lie, while but two such grippers will suffice when the device is applied to a cylindrical vessel or pipe, in which case the device will be so applied that the grippers will lie longitudinally of the cylinder, while the faces of the hub and clamping member will conform to the cylinder.

In applying the tap to a sheet-metal vessel—for instance, as the tins commonly used for containing illuminating and other oils or other more or less liquid substances—I proceed as follows: I screw the spreader $h$ through the hub $a$ to spread the grippers and hold them in that position, Fig. 4. I then punch a hole in the tin by means of one of the grippers. I next screw the spreader sufficiently out of the hub $a$ as to admit of the folding of the grippers $e$, Fig. 3, and then insert the points of said grippers into the previously-punched hole and force the grippers through until the flange $b$ of the hub $a$ bears against the wall $n$. If two grippers are used, the hole punched will be oblong. If three grippers are used, they will form when folded a longitudinally-grooved cone, as shown in Fig. 3, which can be readily pushed through the previously-made hole, and the hole made by the united grippers will be triangular. In either case the walls of the hole will prevent the grippers, hence the hub $a$, from rotating when the spreader $h$ is screwed through said hub, as will be readily understood. The spreader $h$ is now screwed through the hub $a$ to spread the grippers.

The position of the clamping member or chambered collar $j$ on the spreader or stem $h$ relatively to the pivotal axes $d$ of the grippers $e$ is such that when said grippers are spread, as shown in Fig. 4, the said clamping member will or will be about to impinge on the outer wall $n$ of the tin or on an interposed washer $l$, Figs. 1 and 2. If now the stem $h$ is screwed in farther, the hub $a$ being drawn toward the clamping member $j$, the grippers $e$ and said clamping member $j$ will coöperate and act reciprocally to clamp the tap to the washer $l$ and wall $n$ of the tin, so that a perfectly tight joint is obtained between the tin and clamping member in the simplest possible manner.

As is well known, it is not possible to form a fluid-tight joint by the mere screwing together of parts to which such fluid has access, and this is particularly true of liquid hydrocarbons, yet although there may be leakage between the hub $a$ and stem $h$ any liquid escaping along the threads of said parts will be retained in the chamber of the clamping element $j$ by the washer $l$.

In the construction shown in Figs. 1 and 2 and 5 and 6 the slotted portion or ears at right angles to the length of the grippers through which the pivot-pins pass are rounded, the radius of the arc of the circle being equal to the width of the lugs $c$ on hub $a$, so that when said grippers are folded the heels thereof will not project beyond the periphery of said hub.

In the construction shown in Fig. 3 the grippers $e$ are provided with lips $e^5$, which are acted on by the spreader $h$ to spread the grippers, and in this case the heels of the grippers project slightly beyond the periphery of the hub.

In the connection of a branch pipe with a main, for instance, having comparatively thick walls it may be desirable to use the hub $a$ as a plug for the hole drilled in the main, in which case the connection of the grippers with the hub must be such that their heels will not project beyond the periphery of the hub, which may then be flangeless, as shown in Fig. 3, the pipe to be so connected carrying, of course, the clamping member. Fig. 6 shows the mode of plugging up a hole by means of a bolt $p$, the head $p'$ of which constitutes the chambered clamping member.

In the use of my invention on tins such as above described I provide the hub with a flange $b$ of greater diameter than the hole into which the legs $c$ are inserted in order to avoid the liability of such hub dropping into the tin when the tap is being secured thereto by inexperienced persons, in which case the clamping member $j$ is beveled, as shown at $m$, so as not to impinge upon said flange.

I have hereinbefore stated that the front edge of the grippers $e$ is recessed at $e^3$ to form the abrupt shoulder $e'$. The object of this is twofold. When a hole is punched in a tin, its edges are bent inwardly and are more or less ragged. By recessing the grippers these inwardly-bent edges will not interfere with the action of the grippers on the inner face of the wall of the tin.

As shown in the drawings, the grippers are of such length that when spread their shoulders $e'$ lie slightly beyond the contact-face of the clamping member $j$, Fig. 1, against the wall $n$, so that the reciprocal action of said grippers and clamping member will force the tin between said shoulders and contact-face inwardly to form a substantially circular projection, which is clamped to said shoulders, whereby the spreader or tap is more effectually secured to the wall $n$ and lateral displacement avoided.

Having thus described my invention, what

I claim as new therein, and desire to secure by Letters Patent, is—

1. The combination with grippers and an internally-threaded hub to which said grippers are pivoted to fold and spread out radially; of a correspondingly-threaded spreader and a clamping member on the spreader fitting over the hub, said spreader adapted to engage and spread the grippers to hold them against folding and to draw the hub toward said clamping member when the spreader is screwed through the hub, for the purposes set forth.

2. The combination with grippers and an internally-threaded hub to which said grippers are pivoted to fold and spread out radially; of a tubular correspondingly-threaded spreader and a clamping member thereon fitting over the hub, said spreader adapted to engage and spread the grippers and hold them against folding and to draw the hub toward the clamping member when the spreader is screwed through the hub, for the purposes set forth.

3. The combination with the grippers and a hub having portions of different diameter, said grippers pivoted to the hub portion of least diameter to fold and spread out radially; of a correspondingly-threaded spreader and a clamping member thereon fitting over the portion of greatest diameter of the hub, said spreader adapted to engage and spread the grippers and hold them against folding and to draw the hub toward the clamping member when the spreader is screwed through the hub, for the purpose set forth.

4. The combination with the grippers having rounded backs, flat gripping-faces and pointed ends and a hub to which said grippers are pivoted to fold and spread out radially, and when folded to have their points in or substantially in line with the center of the hub; of a tubular spreader and a clamping member thereon fitting over the hub, said spreader adapted to be screwed through the hub and engage and spread the grippers and hold them against folding and to simultaneously draw said hub toward said clamping member, for the purposes set forth.

5. The combination with a hub and grippers pivoted thereto to fold and spread out radially and having heel extensions projecting over the bore of the hub when said grippers are folded; of a spreader and a clamping member thereon projecting over the hub, said spreader adapted to be screwed through the bore of said hub and thereby engage said extensions, spread the grippers, hold them against folding and simultaneously draw the hub toward the clamping member, for the purpose set forth.

6. The combination with a hub and grippers having heel-lugs pivotally connected to said hub and so constructed as not to project beyond the periphery of such hub when the grippers are folded, said grippers having heel extensions projecting over the bore of the hub when so folded; of a spreader and a clamping member thereon, said spreader screwing through the hub and thereby engage and spread the grippers, hold them against folding and simultaneously draw the hub toward said clamping member, for the purposes set forth.

7. The combination with the grippers and a hub to which they are pivoted to fold and spread out radially; of a spreader and a chambered clamping member thereon fitting over the hub, said spreader screwing through the hub and adapted to engage and spread the grippers and hold them against folding and to simultaneously draw the hub toward the clamping member, for the purposes set forth.

8. The combination with a hub, grippers pivoted thereto to fold and spread out radially, said grippers being recessed to form a shoulder $e'$ at the inner end of a flat gripping-surface $g$; of a spreader and a circular clamping member thereon fitting around the hub within the circle of the aforesaid shoulders $e'$, said spreader screwing through the hub and adapted to engage and spread the grippers and hold them against folding and simultaneously draw the hub toward the clamping member, for the purpose set forth.

9. The combination with a hub and folding grippers carried thereby; of a threaded member and a clamping member thereon, said threaded member screwing through the hub and thereby spreading the grippers and simultaneously drawing said hub toward the clamping member, for the purposes set forth.

10. The combination with a hub provided with an abutment and grippers pivoted to said hub in front of its abutment; of a threaded member and a clamping member thereon, said threaded member screwing through the hub and thereby spreading the grippers and drawing said hub toward the clamping member, for the purposes set forth.

11. In combination with a hub having a bore formed therein, an abutment on said hub, gripping members pivoted on the hub in front of said abutment, a projection on each gripping member adapted to lie across said bore, a member adapted to be inserted into said bore and engage the projection of each gripping member and a tightening member out of contact with the hub, substantially as and for the purpose specified.

12. In combination with a hub portion having a threaded central bore, an abutment formed on the periphery of the hub, gripping members pivotally mounted on the hub in front of said abutment, a projection on each gripping member adapted to lie across the bore of the hub, a threaded member screwing into said bore to move said projection parallel to the longitudinal axis of the bore, and a tightening member out of contact with the hub, substantially as described.

13. A draw-off attachment for vessels, comprising a hub portion having a threaded central bore, a peripheral flange on said hub, lugs formed on one end of the latter, arms pivoted on said lugs, a gripping-face formed on one end, a nose on the opposite end of each of said arms, and a tube movable in said bore adapted to engage the nose of each arm and radially move the gripping end, substantially as described.

14. A draw-off attachment for vessels, comprising a hub portion having a central bore, a peripheral flange on said hub, gripping members pivoted on the hub, projections on said members adapted to lie across the bore of the hub, a tube movable in said bore adapted to engage said projections, and a tightening member carried by the tube, substantially as and for the purpose specified.

15. The combination with a vessel having an aperture formed therein, of a hub having a central bore therein and adapted to be seated in said aperture, an abutment on the hub adapted to engage the wall, gripping members on the hub adapted to be projected through said aperture, a member insertible in said bore adapted to radially spread said gripping members, and a tightening member on the spreading member and out of contact with said hub, substantially as and for the purposes specified.

16. The combination with the wall of a vessel having an aperture formed therein, of a hub adapted to be inserted in the aperture, a flange on said hub of larger diameter than the aperture, gripping members pivotally mounted on the hub in front of said flange capable of being assembled within the circumference of the aperture, means for spreading the grippers beyond said circumference and a member operated by the spreading means adapted to engage the vessel, substantially as and for the purposes specified.

17. The combination with the wall of a vessel having an aperture formed therein, of a hub having a threaded central bore and adapted to be inserted in the aperture, a peripheral flange on said hub of larger diameter than the aperture, arms pivoted on the hub in front of said flange capable of being assembled within the circumference of the aperture, a gripping-face formed on one end, a nose on the opposite end of each of said arms, a tube movable in said bore adapted to engage the nose of each arm to radially move the gripping end, a nut carried by the tube adapted to engage the wall of the vessel and a tap on said tube, substantially as and for the purposes specified.

18. The combination with a vessel having an aperture therein, a hub insertible into said aperture and grippers pivoted to said hub to fold and spread out radially; of a tap having a stem screwing into said hub and a chambered clamping member fitting over the hub, said stem adapted to engage and spread the grippers and simultaneously draw the hub toward the clamping member to clamp the tap to the vessel, and an elastic washer interposed between said clamping member and the vessel, for the purposes specified.

In witness whereof I have hereunto set my hand in presence of two witnesses.

LEWIS ERNEST SAUNDERS.

Witnesses:
RICHARD SPARROW,
FRED WALTHAM.